(12) United States Patent  (10) Patent No.: US 9,355,497 B2
Yamakawa  (45) Date of Patent: May 31, 2016

(54) IMAGE PROCESSING SYSTEM, IMAGE PROCESSING APPARATUS, AND IMAGE PROCESSING METHOD FOR COMBINING CG IMAGE WITH CAPTURED IMAGE

(71) Applicant: CANON KABUSHIKI KAISHA, Tokyo (JP)

(72) Inventor: Yuichi Yamakawa, Kamagaya (JP)

(73) Assignee: Canon Kabushiki Kaisha, Tokyo (JP)

( * ) Notice: Subject to any disclaimer, the term of this patent is extended or adjusted under 35 U.S.C. 154(b) by 228 days.

(21) Appl. No.: 14/258,952

(22) Filed: Apr. 22, 2014

(65) Prior Publication Data

US 2014/0320526 A1  Oct. 30, 2014

(30) Foreign Application Priority Data

Apr. 24, 2013 (JP) ................... 2013-091520

(51) Int. Cl.
*G06T 19/00* (2011.01)
*G06T 7/00* (2006.01)

(52) U.S. Cl.
CPC ............. *G06T 19/006* (2013.01); *G06T 7/0044* (2013.01); *G06T 2207/30244* (2013.01)

(58) Field of Classification Search
None
See application file for complete search history.

(56) References Cited

FOREIGN PATENT DOCUMENTS

JP  2002-259992 A  9/2002
JP  2010-92436 A  4/2010

*Primary Examiner* — Mark Zimmerman
*Assistant Examiner* — Vu Nguyen
(74) *Attorney, Agent, or Firm* — Canon U.S.A., Inc. IP Division

(57) ABSTRACT

An image processing system includes an imaging unit for imaging an outside world to generate a captured image, a position and orientation estimation unit for estimating a position and orientation of the imaging unit, a feature point estimation unit for estimating a position of a feature point in the captured image, a clipping unit for clipping an image for combining, and clipping an image for feature detection, a measurement unit for detecting a feature point from the image for feature detection, and measuring a position and orientation of the imaging unit, a generation unit for generating a CG image based on the position and orientation measured by the measurement unit, a combining unit for combining the image clipped by the clipping unit with the CG image, and a display control unit for displaying the image combined by the combining unit on a display unit.

15 Claims, 22 Drawing Sheets

FIG. 7A

|              | x  | y  | z |
|--------------|----|----|---|
| POSITION(cm) | 10 | 20 | 0 |
| ORIENTATION  | 1  | 0  | 0 |

FIG. 7B

|              | x  | y  | z  |
|--------------|----|----|----|
| POSITION(cm) | 40 | 20 | 10 |
| ORIENTATION  | -1 | 0  | 0  |
| SIZE(cm)     | 2  | 2  | 2  |

FIG. 7C

|                              | x  | y | z  |
|------------------------------|----|---|----|
| POSITION VECTOR              | 30 | 0 | 10 |
| ORIENTATION DIRECTION VECTOR | 1  | 0 | 0  |

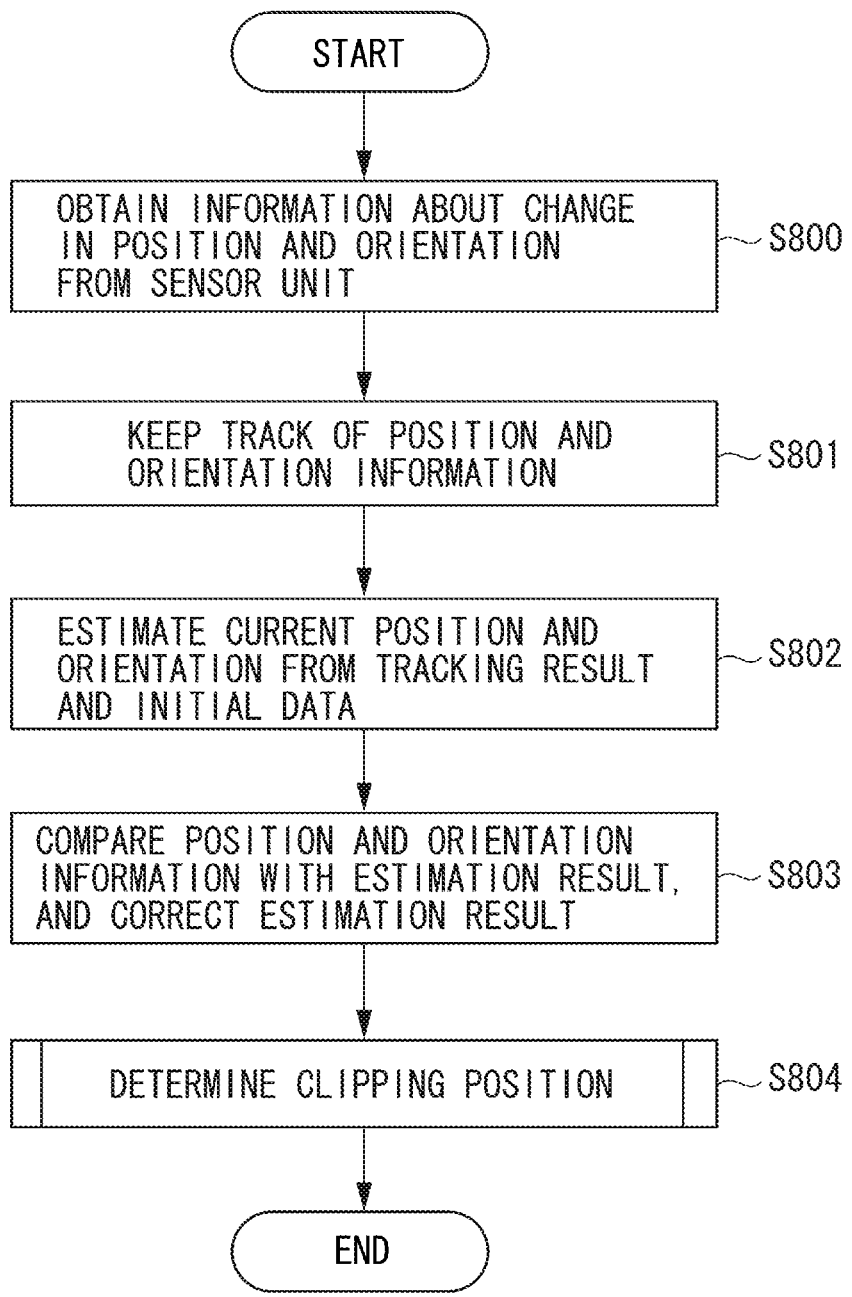

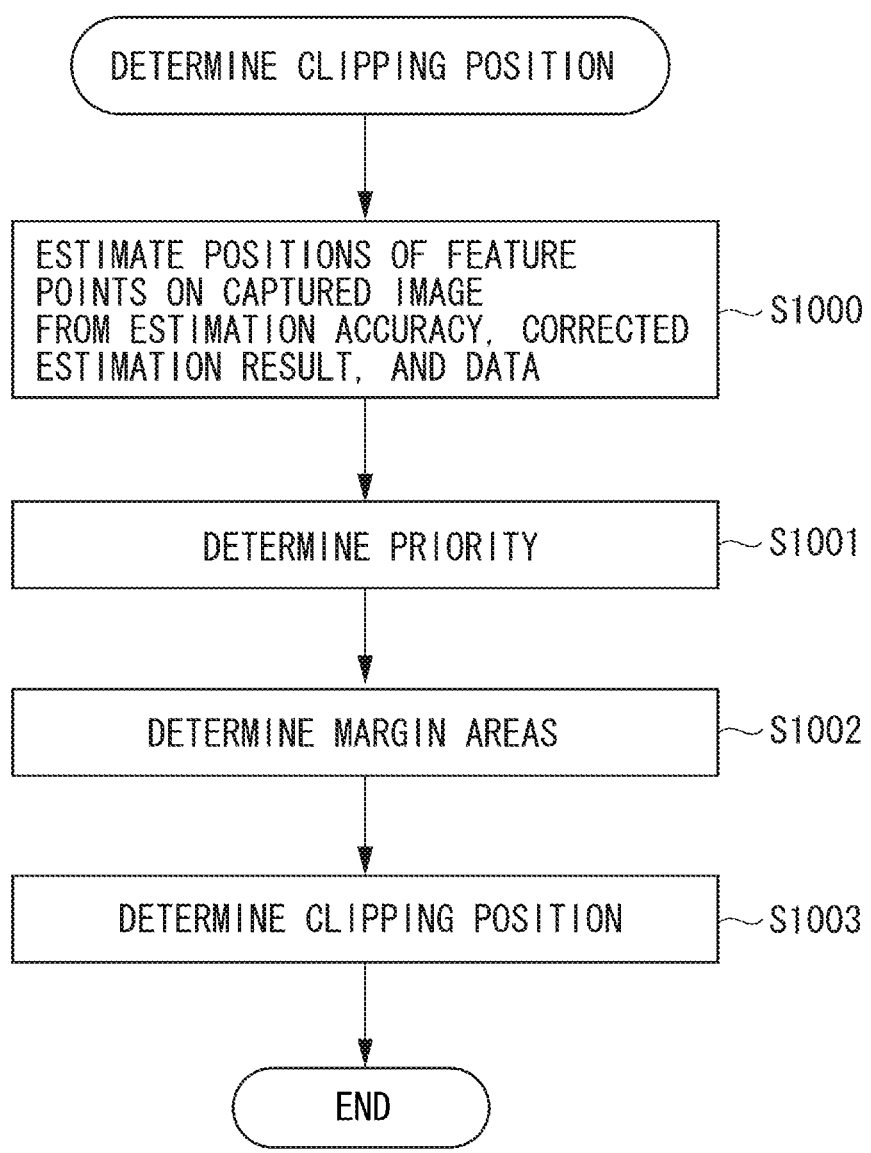

FIG. 13

| COORDINATES OF MARGIN AREA | FEATURE POINT A | FEATURE POINT B | FEATURE POINT C | FEATURE POINT D |
|---|---|---|---|---|
| Xmin(PIXELS) | 100 | 490 | 470 | 470 |
| Xmax(PIXELS) | 300 | 590 | 520 | 500 |
| Ymin(PIXELS) | 100 | 150 | 50 | 440 |
| Ymax(PIXELS) | 300 | 250 | 100 | 470 |
| SIZE OF MARGIN AREA | 40000 | 10000 | 2500 | 900 |
| PRIORITY | 1 | 2 | 3 | 4 |

FIG. 17A

| FEATURE POINT | SIZE OF MARGIN AREA | PRIORITY | CLIPPING |
|---|---|---|---|
| A | 4000 | 1 |  |
| B | 2500 | 3 |  |
| C | 3000 | 2 |  |
| D | 2000 | 4 |  |
| E | 1000 | 5 |  |

FIG. 17B

| FEATURE POINT | SIZE OF MARGIN AREA | PRIORITY | CLIPPING |
|---|---|---|---|
| A | 4000 | 1 |  |
| C | 3000 | 2 |  |
| B | 2500 | 3 |  |
| D | 2000 | 4 |  |
| E | 1000 | 5 |  |

FIG. 17C

| FEATURE POINT | SIZE OF MARGIN AREA | PRIORITY | CLIPPING |
|---|---|---|---|
| A | 4000 | 1 | ○ |
| C | 3000 | 2 | ○ |
| B | 2500 | 3 | ○ |
| D | 2000 | 4 | × |
| E | 1000 | 5 | × |

FIG. 21A (FRAME HEADER)

| A | CLIPPING POSITION | NUMBER OF ROWS | NUMBER OF COLUMNS | B | CLIPPING POSITION | NUMBER OF ROWS | NUMBER OF COLUMNS |

| A | PIXEL DATA |

⋮

| A | PIXEL DATA |

FIG. 21B

| A | PIXEL DATA |

| B | PIXEL DATA |

| A | PIXEL DATA |

| B | PIXEL DATA |

⋮

| A | PIXEL DATA |

| B | PIXEL DATA |

FIG. 21C

| A | PIXEL DATA |

⋮

| A | PIXEL DATA |

IMAGE PROCESSING SYSTEM, IMAGE PROCESSING APPARATUS, AND IMAGE PROCESSING METHOD FOR COMBINING CG IMAGE WITH CAPTURED IMAGE

BACKGROUND OF THE INVENTION

1. Field of the Invention

The present invention relates to an image processing system, an image processing apparatus, an image processing method, and a program suitable for use to combine a computer graphics (CG) image with a captured image in a mixed reality (MR) technique in particular.

2. Description of the Related Art

MR techniques have recently been known as techniques for seamlessly integrating the real world and a virtual world in real time. Among the MR techniques, there is a technique for providing a mixed reality image to a user by using a video see-through head mounted display (HMD). The video see-through HMD includes a built-in video camera, which captures an image of an object substantially coincident with an object observed from the user's pupil position. An image obtained by combining a CG image on the captured image is displayed on a display panel of the video see-through HMD, whereby a mixed reality space is provided to the user.

A method using a feature point detected from the captured image and a measurement result of a position and orientation of the video see-through HMD is known as a technique for determining the position to combine the CG image. For performing highly accurate positioning, a greater number of feature points need to be captured with higher definition. For that purpose, the video see-through HMD desirably obtains the captured image with high resolution having a wider viewing angle. In the MR techniques, a high-resolution captured image with a wide viewing angle and a high-resolution display image are also desired for providing a realistic and dynamic feeling to a user. A video see-through HMD typically has an imaging viewing angle similar to a display viewing angle. Japanese Patent Application Laid-Open No. 2010-92436 discusses a method for making the imaging viewing angle wider than the display viewing angle to capture feature points in a wider range, and clipping a partial area of the captured image to generate a display image.

According to the method discussed in Japanese Patent Application Laid-Open No. 2010-92436, more feature points can be imaged by widening the imaging viewing angle. The wider viewing angle, however, lowers the resolution per pixel. To accurately measure the position and orientation, resolution of the captured image needs to be increased as the viewing angle widens. The processing load of processing for detecting feature points from a captured image is typically high. The use of the high-resolution captured image increases the system load.

SUMMARY OF THE INVENTION

The present invention is directed to a mixed reality space capable of providing a realistic and dynamic feeling to a user without increasing processing load.

According to an aspect of the present invention, an image processing system includes an imaging unit configured to image an outside world to generate a captured image, a position and orientation estimation unit configured to estimate a position and orientation of the imaging unit, a feature point estimation unit configured to estimate a position of a feature point in the captured image based on the position and orientation of the imaging unit estimated by the position and orientation estimation unit, a clipping unit configured to clip an image for combining, and clip an image for feature detection based on the position of the feature point estimated by the feature point estimation unit, from the captured image generated by the imaging unit, a measurement unit configured to detect a feature point from the image for feature detection clipped by the clipping unit, and measure a position and orientation of the imaging unit based on the detected feature point, a generation unit configured to generate a CG image based on the position and orientation measured by the measurement unit, a combining unit configured to combine the image for combining clipped by the clipping unit with the CG image generated by the generation unit, and a display control unit configured to display the image combined by the combining unit on a display unit.

Further features of the present invention will become apparent from the following description of exemplary embodiments with reference to the attached drawings.

BRIEF DESCRIPTION OF THE DRAWINGS

FIGS. 7A, 7B, and 7C are tables each illustrating an example of position and orientation information about a HMD and feature point information.

FIG. 8 is a flowchart illustrating an example of a processing procedure of the position estimation unit.

FIG. 10 is a flowchart illustrating an example of a detailed processing procedure of a clipping position determination unit according to a first exemplary embodiment.

FIG. 13 is a table illustrating an example of a list of coordinates and sizes of margin areas.

FIGS. 17A, 17B, and 17C are tables illustrating an sorting example of feature points in order of priority based on sizes of margin areas.

FIGS. 21A, 21B, and 21C are diagrams each illustrating an example of data to be transmitted to the PC, sorted in order of transmission.

DESCRIPTION OF THE EMBODIMENTS

Various exemplary embodiments, features, and aspects of the invention will be described in detail below with reference to the drawings.

A first exemplary embodiment of the present invention will be described below with reference to the drawings.

Figure 1:
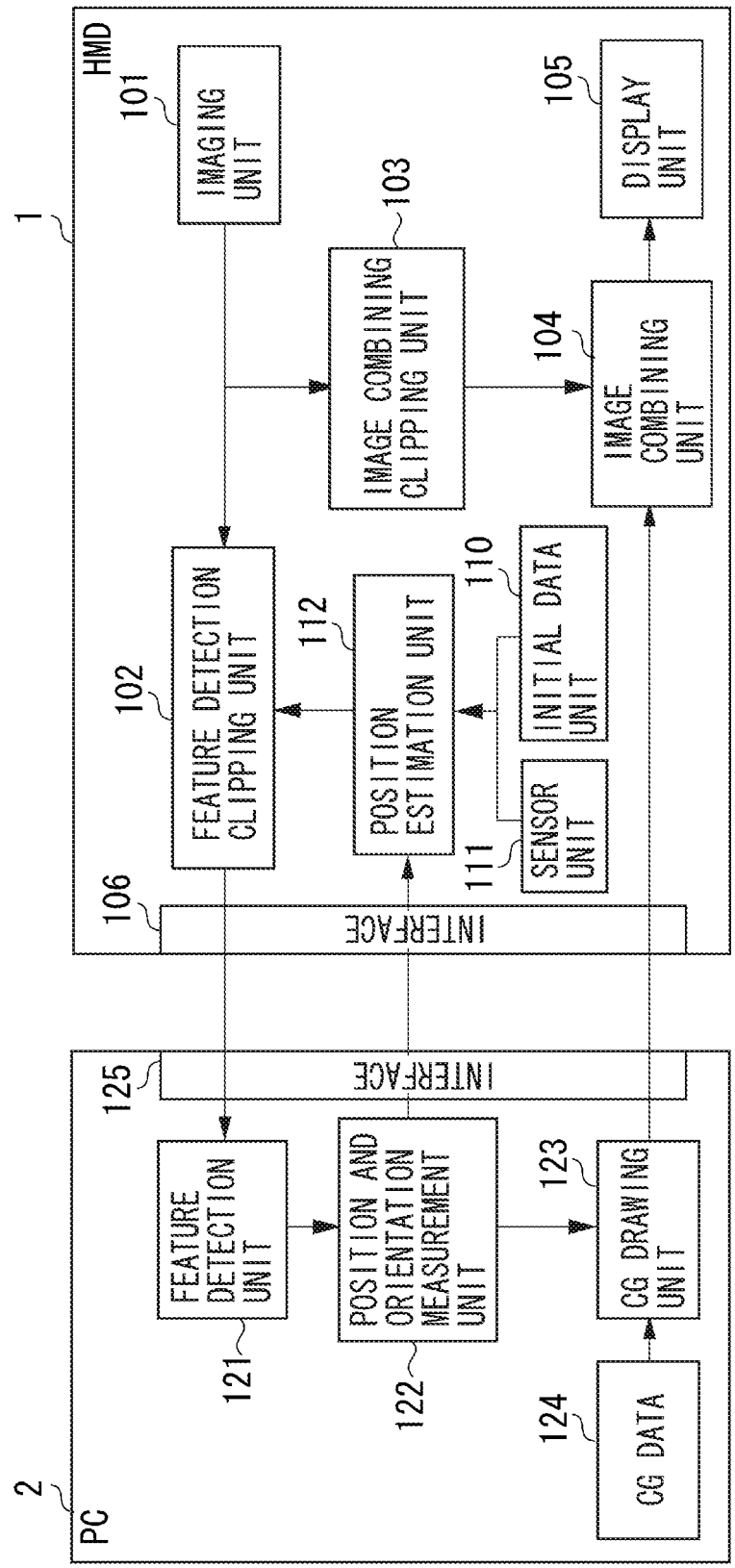
FIG. 1 is a block diagram illustrating an example of an internal configuration of an image processing system according to an exemplary embodiment.

FIG. 1 is a block diagram illustrating an example of an internal configuration of an image processing system according to the present exemplary embodiment. The image processing system according to the present exemplary embodiment is a mixed reality (MR) system for providing mixed reality to a user. The image processing system includes a video see-through head mounted display (hereinbelow, referred to as HMD) 1 and a personal computer (PC) 2 serving as an information processing apparatus.

In FIG. 1, an imaging unit 101 images an outside world. A feature detection clipping unit 102 clips a part of a captured image generated by the imaging unit 101.

A position estimation unit 112 estimates a position and orientation of the HMD 1 from data stored in an initial data unit 110 and a sensor unit 111. The position estimation unit 112 instructs the feature detection clipping unit 102 about a clipping position of the captured image. The captured image generated by the imaging unit 101 is also transmitted to an image combining clipping unit 103. The image combining clipping unit 103 clips a part of the captured image as an image for image combining described below.

The feature detection clipping unit 102 transmits the clipped captured image (hereinbelow, referred to as an image for feature detection) and information about the clipping position of the captured image instructed by the position estimation unit 112 to a feature detection unit 121 of the PC 2 via an interface 106. The feature detection unit 121 detects feature points from the clipped captured image, and transmits the detection result and the information about the clipping position to a position and orientation measurement unit 122.

The position and orientation measurement unit 122 measures a position and orientation of the HMD 1 based on the clipping position of the captured image and the positions of the feature points detected by the feature detection unit 121. The position and orientation measurement unit 122 transmits the measurement result to a CG drawing unit 123. The CG drawing unit 123 draws a computer graphics (CG) image based on CG data 124 according to the measured position and orientation of the HMD 1. The drawn CG image is transmitted from the PC 2 to the HMD 1 via an interface 125.

An image combining unit 104 combines the captured image clipped by the image combining clipping unit 103 (hereinbelow, referred to as an image for combining) with the CG image drawn by the CG drawing unit 123. The image combining unit 104 further performs display control for displaying the combined image on a display unit 105. In such a manner, mixed reality can be provided to the user.

Figure 2:
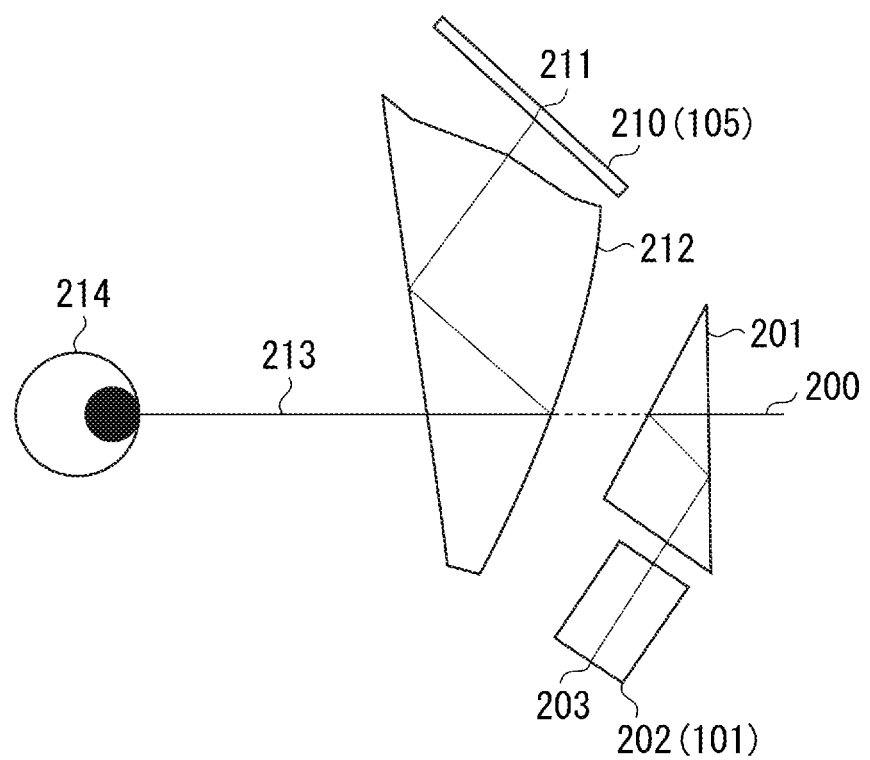
FIG. 2 is a schematic diagram illustrating an optical relationship between imaging and displaying.

Processing of the image combining clipping unit 103 will be described with reference to FIGS. 2 and 3. FIG. 2 is a schematic diagram illustrating an optical relationship between imaging and displaying. In FIG. 2, a light beam 200 passes through an imaging prism 201 and is imaged by an imaging unit 202 (corresponding to the imaging unit 101 illustrated in FIG. 1). A light beam 213 displayed on a display unit 210 (corresponding to the display unit 105 illustrated in FIG. 1) passes through a display prism 212 and is incident on an eye 214. A point 203 represents the light imaged at the center of the imaging unit 101. The light is reproduced at a center point 211 of the display unit 210. In the HMD 1 according to the present exemplary embodiment, the optical axis of the light beam 200 generally coincides with that of the light beam 213.

Figure 3:
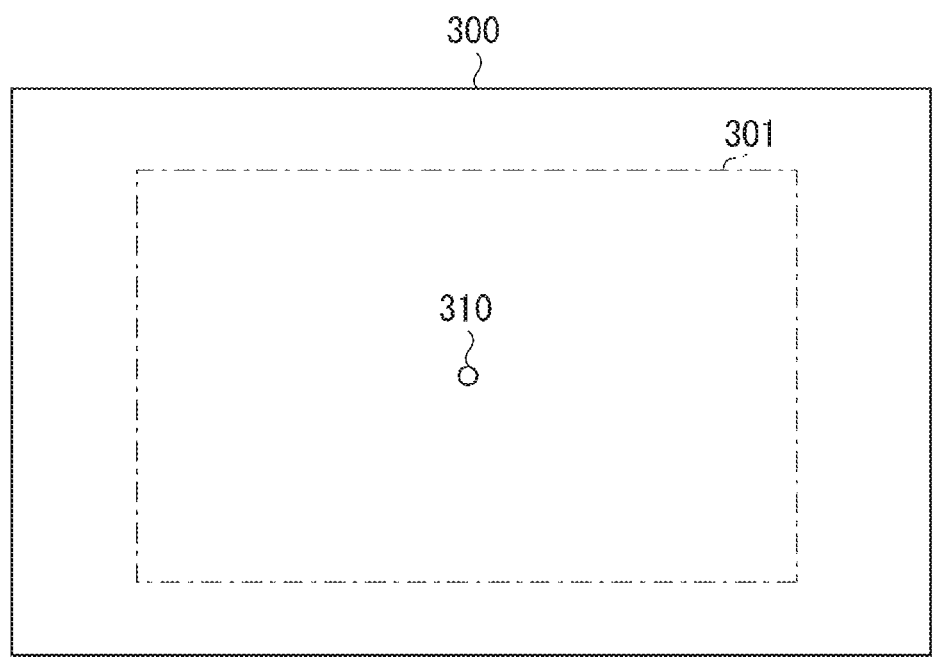
FIG. 3 is a diagram illustrating a relationship between an image obtained by an imaging unit and an image displayed on a display unit.

FIG. 3 is a diagram illustrating a relationship between an image obtained by the imaging unit 101 and an image displayed on the display unit 105. In FIG. 3, a frame 300 represents the frame of the image obtained by the imaging unit 101. A frame 301 represents the frame of the image that is clipped from the captured image by the image combining clipping unit 103 and displayed on the display unit 105. A point 310 represents a pixel corresponding to the points 203 and 211 of FIG. 2. To align the optical axis of the captured image with that of the display image, the position to clip the display image from the captured image cannot be movable and needs to remain the same.

Processing of the feature detection clipping unit 102 will be described. The image for feature detection clipped by the feature detection clipping unit 102 is only used to detect feature points, and not displayed on the display unit 105 of the HMD 1. Since it is important to clip an area including more feature points, the clipping position to be clipped by the feature detection clipping unit 102 is not always fixed.

Figure 4:
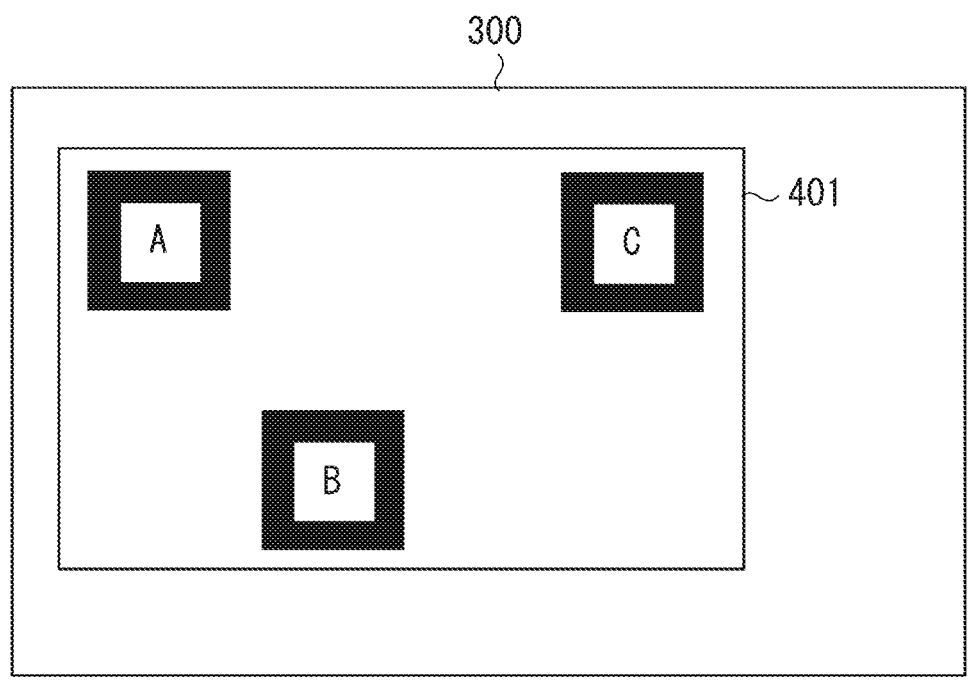
FIG. 4 is a diagram illustrating a relationship between a captured image and an image for feature detection.

FIG. 4 is a diagram illustrating a relationship between a captured image and an image for feature detection. In FIG. 4, a frame 401 represents the frame of the image for feature detection clipped by the feature detection clipping unit 102. The position estimation unit 112 instructs the feature detection clipping unit 102 about the clipping position. The feature detection clipping unit 102 transmits only the image of the target area clipped based on the instructed clipping position to the interface 106, and therefore does not need a frame buffer.

Figure 5:
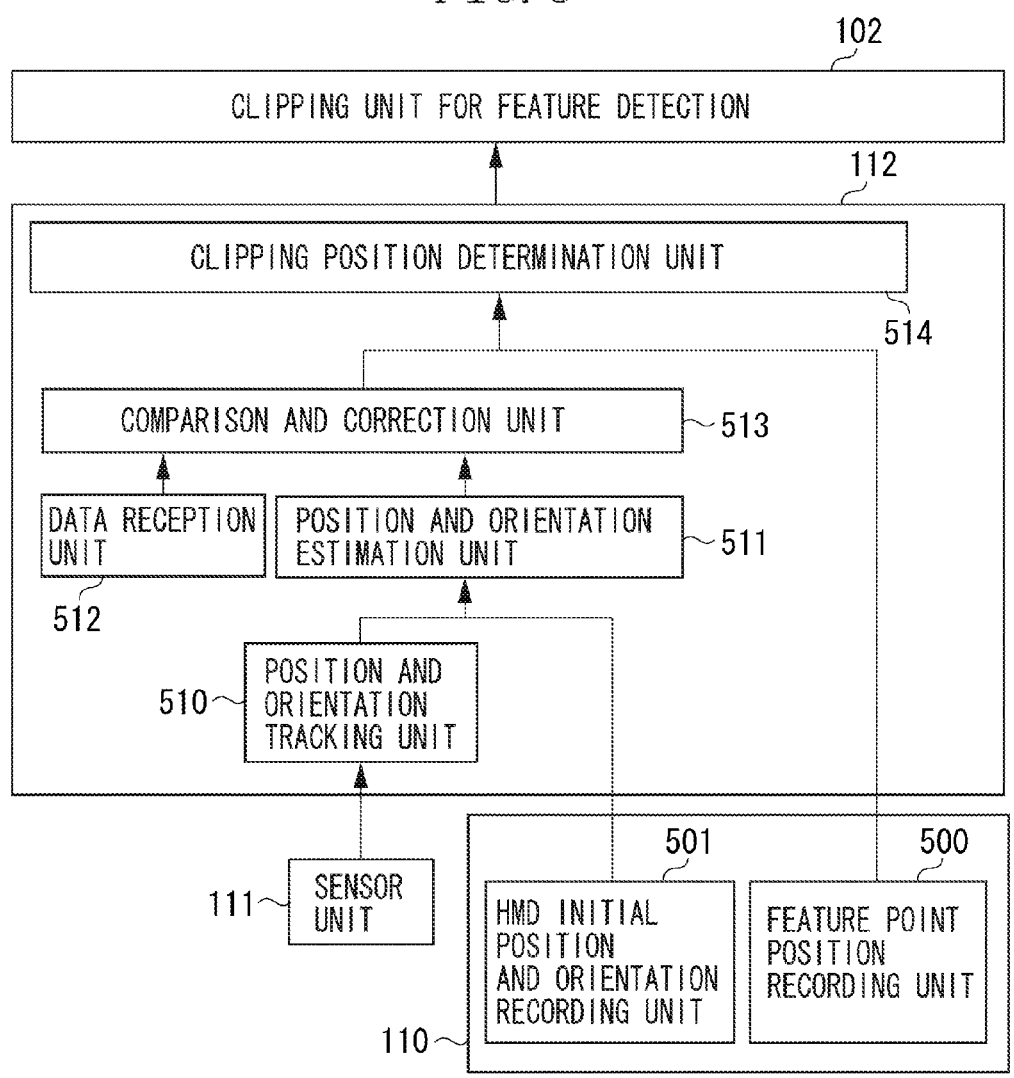
FIG. 5 is a block diagram illustrating a detailed configuration example of a position estimation unit and an initial data unit.

Specific processing in which the position estimation unit 112 instructs the feature detection clipping unit 102 about the clipping position will be described with reference to FIG. 5. FIG. 5 is a block diagram illustrating a detailed configuration example of the position estimation unit 112 and the initial data unit 110. According to the present exemplary embodiment, the initial data unit 110, the sensor unit 111, and the position estimation unit 112 are used to specify the clipping position.

In FIG. 5, the initial data unit 110 includes a feature point position recording unit 500 and an HMD initial position and orientation recording unit 501. The feature point position recording unit 500 records three-dimensional arrangement positions of feature points. The HMD initial position and orientation recording unit 501 records position and orientation information about the HMD 1 upon starting the HMD 1. The three-dimensional arrangement positions of feature points refer to those of feature points measured by the position and orientation measurement unit 122 of the PC 2 in advance upon starting the image processing system. The feature point position recording unit 500 obtains the three-dimensional arrangement positions of the feature points via the interface 106. The position and orientation information about the HMD 1 upon starting the HMD 1 is measured by the position and orientation measurement unit 112 of the PC 2 by measuring the position and orientation of the HMD 1 upon starting the image processing system. The HMD initial position and orientation recording unit 501 obtains the position and orientation information via the interface 106.

The position estimation unit 112 includes a position and orientation tracking unit 510, a position and orientation estimation unit 511, a data reception unit 512, a comparison and correction unit 513, and a clipping position determination unit 514. The position and orientation tracking unit 510 keeps track of changes in the position and orientation of the HMD 1 transmitted from the sensor unit 111. The position and orientation tracking unit 510 measures a displacement from the initial position of the HMD 1 and transmits the measurement result to the position and orientation estimation unit 511. The sensor unit 111 is a sensor for detecting a change in position and orientation. Examples include a gyroscope sensor and an acceleration sensor.

By a method for tracking a position and orientation by using a gyroscope sensor and/or an acceleration sensor, like the position and orientation tracking unit 510 performs, errors may be accumulated as the tracking time increases. Meanwhile, the PC 2 measures the position and orientation of the HMD 1 by using the result of feature point detection. Therefore, the accumulation of errors with time does not occur. The comparison and correction unit 513 described below regularly corrects the position and orientation information about the HMD 1 tracked via the sensor unit 111 by using the position and orientation information obtained by the PC 2.

The position and orientation estimation unit 511 sequentially estimates the position and orientation of the HMD 1 based on the displacement from the initial position, determined by the position and orientation tracking unit 510, and the initial position and orientation information recorded in the HMD initial position and orientation recording unit 501. The position and orientation estimation unit 511 transmits the estimation result of the position and orientation to the comparison and correction unit 513. The data reception unit 512 regularly receives the measurement result of the position and orientation of the HMD 1 measured by the position and orientation measurement unit 122 of the PC 2 in each frame or every few frames, and transmits the measurement result to the comparison and correction unit 513.

The comparison and correction unit 513 compares the position and orientation of the HMD 1 estimated by the position and orientation estimation unit 511 with the measurement result of the position and orientation of the HMD 1 received by the data reception unit 512. The comparison and correction unit 513 corrects the estimation result of the position and orientation estimation unit 511 based on the result of comparison. The comparison and correction unit 513 includes a memory and records the estimation results of the position and orientation estimation unit 511 for several frames.

The comparison and correction unit 513 receives the measurement result of the position and orientation of the HMD 1 from the data reception unit 512 with delay of several frames as compared to the estimation result obtained by the position and orientation estimation unit 511. The reason is that the position and orientation measurement unit 122 of the PC 2 measures the position and orientation from the image for feature detection that is clipped by the feature detection clipping unit 102 based on the estimation result obtained by the position estimation unit 112. The comparison and correction unit 513 therefore compares the position and orientation information received from the data reception unit 512 with the position and orientation information estimated by the position and orientation estimation unit 511 at the same point of time to obtain correction information. The comparison and correction unit 513 corrects the latest position and orientation information estimated by the position and orientation estimation unit 511.

The comparison and correction unit 513 transmits the corrected position and orientation information and information about estimation accuracy of the position and orientation to the clipping position determination unit 514. The estimation accuracy refers to a parameter that determines the size of a margin area including a feature point described below. The estimation accuracy has a value for each frame and each feature point. The comparison and correction unit 513 determines the estimation accuracy when comparing data. The value of the estimation accuracy may be determined such that the greater the difference between the time of comparison and the current time, the higher the value.

The clipping position determination unit 514 estimates positions and sizes of feature points on the captured image based on the position and orientation information about the HMD 1 and the information about the estimation accuracy transmitted from the comparison and correction unit 513 and three-dimensional arrangement information about the feature points transmitted from the feature point position recording unit 500.

Figure 6:
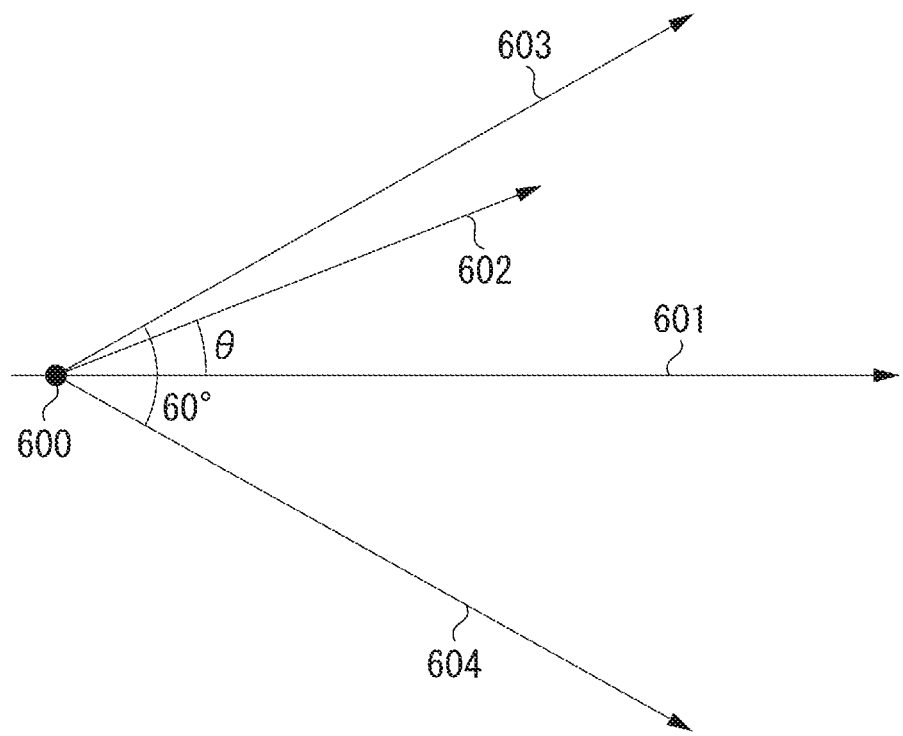
FIG. 6 is a diagram illustrating a concept of a method for estimating a position of a feature point.

FIG. 6 is a diagram for describing a concept of a method for estimating the position of a feature point. In FIG. 6, it is presumed that the HMD 1 has an imaging viewing angle of 60° both in horizontal and vertical directions.

FIG. 6 illustrates a positional relationship between the position and orientation of the HMD 1 and a feature point on a plane including a position vector of the feature point and an orientation direction vector of the HMD 1. In FIG. 6, a point 600 indicates the position of the HMD 1. A vector 601 indicates the direction of the orientation direction vector of the HMD 1. A vector 602 indicates the position vector of the feature point with the position of the HMD 1 as the origin. The angle formed between vectors 603 and 604 corresponds to the viewing angle of 60°. The imaging range of the HMD 1 is an area between the vectors 603 and 604.

Whether the feature point is included in the captured image depends on whether the angle θ formed between the vectors 601 and 602 is smaller than or equal to 30°. The cosine of the formed angle (cos θ) can be easily obtained from the relationship between the scalar product and the magnitudes of the vectors 601 and 602. In the example illustrated in FIG. 6, the HMD 1 can image the feature point if cos 30°≈0.87<cos θ. If the feature point is determined to be imaged, the size in which the feature point is displayed on an imaging screen is calculated. The size on the imaging screen can be assumed to decrease with distance from the HMD 1. The size on the imaging screen is determined by calculating "actual dimension/distance." A specific method will be described below with reference to FIGS. 7A, 7B, and 7C.

In FIGS. 7A, 7B, and 7C, positions are described in terms of a global coordinate system. As for orientation, a front direction is represented by a vector having a magnitude of 1. The size of a feature point is described in terms of actual dimensions. The front direction of the HMD 1 refers to the imaging direction of the imaging unit 101. The front direction of a feature point refers to the direction in which the feature point faces front. The two orientation directions are opposite when the HMD 1 and the feature point directly face each other.

A table illustrated in FIG. 7A indicates position and orientation information about the HMD 1 obtained from the comparison and correction unit 513. A table illustrated in FIG. 7B indicates feature point information about a feature point read from the feature point position recording unit 500. Whether the feature point is imaged within the screen having the viewing angles of 60° in the horizontal and vertical directions from the HMD 1 is initially calculated. A table illustrated in FIG. 7C indicates the position vector of the feature point when seen from the HMD 1 and the orientation direction vector of the HMD 1. With the magnitudes and the scalar product of the two vectors, $\cos\theta \approx 0.95$ can be obtained. Since $\cos\theta$ is greater than $\cos 30°$, the center of the feature point is determined to be imaged. A similar determination is performed for the area surrounding the feature point. If the feature point is determined to be imaged, the size of the feature point on the imaging screen is calculated. Each side of the feature point on the imaging screen has a length of $2\text{ cm}/(10\sqrt{10})$ cm in which relative value is approximately 0.063. Since feature points have their own orientation information, which may be used to determine size.

The clipping position determination unit 514 determines the clipping position of the captured image from the positions of the feature points on the captured image determined by the foregoing method and the estimation accuracy of the comparison and correction unit 513. The clipping position determination unit 514 instructs the feature detection clipping unit 102 about the clipping position. Since the position and orientation of the HMD 1 are measured using feature points in the image for feature detection clipped by the feature detection clipping unit 102, it is basically desirable to clip a location where more feature points are imaged. Large feature points on the captured image, however, allow more accurate position and orientation measurement than small ones. Therefore, according to the present exemplary embodiment, higher priority is given to larger ones among a plurality of feature points, and the feature detection clipping unit 102 clips an image so as to include a large feature point.

FIG. 8 is a flowchart illustrating an example of a processing procedure of the position estimation unit 112.

In step S800, the position and orientation tracking unit 510 obtains information about a change in position and orientation from the sensor unit 111. In step S801, the position and orientation tracking unit 510 measures a displacement from the initial position to keep track of the position and orientation information.

In step S802, the position and orientation estimation unit 511 estimates the current position and orientation from the tracking result of the position and orientation in step S801 and the initial data of the position and orientation recorded in the HMD initial position and orientation recording unit 501. In step S803, the comparison and correction unit 513 compares the position and orientation information obtained from the data reception unit 512 with the estimation result of step S802 to calculate estimation accuracy, and corrects the latest estimation result of step S802. In step S804, the clipping position determination unit 514 estimates the positions of feature points on the imaging screen from the estimation accuracy and the corrected estimation result of step S803 and data from the feature point position recording unit 500. The clipping position determination unit 514 instructs the feature detection clipping unit 102 about the clipping position and size.

Figure 9:
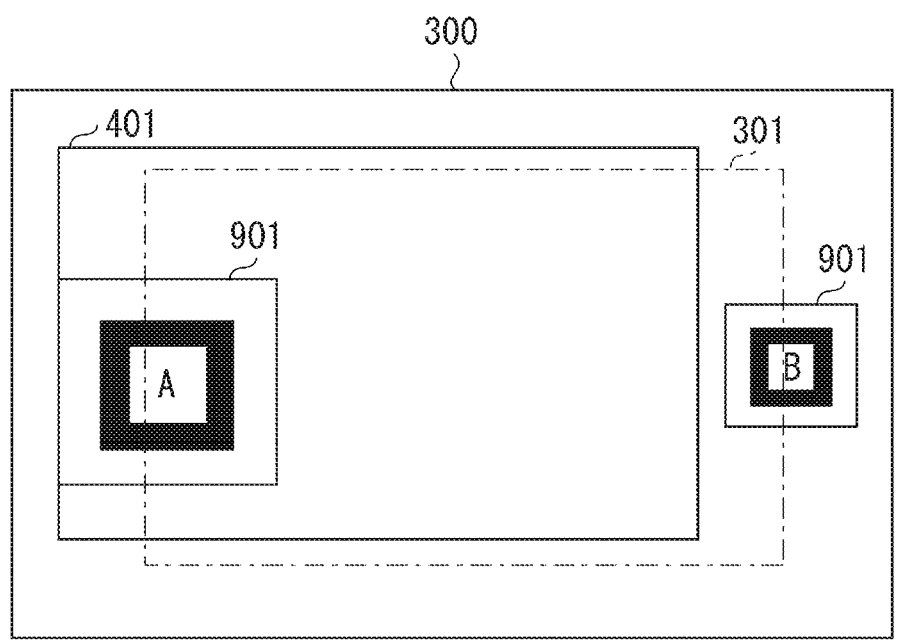
FIG. 9 is a diagram illustrating feature points and margin areas in a captured image.

The processing of the clipping position determination unit 514 in step S804 of FIG. 8 will be described in detail with reference to FIGS. 9 and 10. In FIG. 9, frames 901 represent margin areas for the estimated positions of the feature points on the imaging screen. Each margin area surrounds the estimated position of a feature point with the size of the feature point and the size corresponding to the estimation accuracy transmitted from the comparison and correction unit 513.

FIG. 10 is a flowchart illustrating an example of a detailed processing procedure of the clipping position determination unit 514 in step S804 of FIG. 8.

In step S1000, the clipping position determination unit 514 estimates the positions of feature points on the imaging screen by the method described above from the estimation accuracy and the corrected estimation result of step S803 and the data from the feature point position recording unit 500. In step S1001, the clipping position determination unit 514 determines priority among the estimated feature points. In the example illustrated in FIG. 9, the feature point on the left side is estimated to be larger than the feature point on the right side. The clipping position determination unit 514 thus determines to give higher priority to the feature point on the left side.

In step S1002, the clipping position determination unit 514 determines the margin area of each feature point based on the size and the estimation accuracy of the feature points. According to the example illustrated in FIG. 9, the clipping position determination unit 514 determines the margin areas surrounded by the frames 901. In step S1003, the clipping position determination unit 514 determines the clipping position of the image for feature detection so that the margin area including the feature point having the highest priority determined in step S1001 is included. In the present exemplary embodiment, as illustrated by a frame 401 of FIG. 9, the number of images for feature detection to be clipped is always one. The image for feature detection to be clipped shall always have the same size. The clipping position determination unit 514 determines the clipping position so that the area to be clipped outside the margin area extends toward the center of the captured image with respect to the position of the feature point.

Figure 11A:
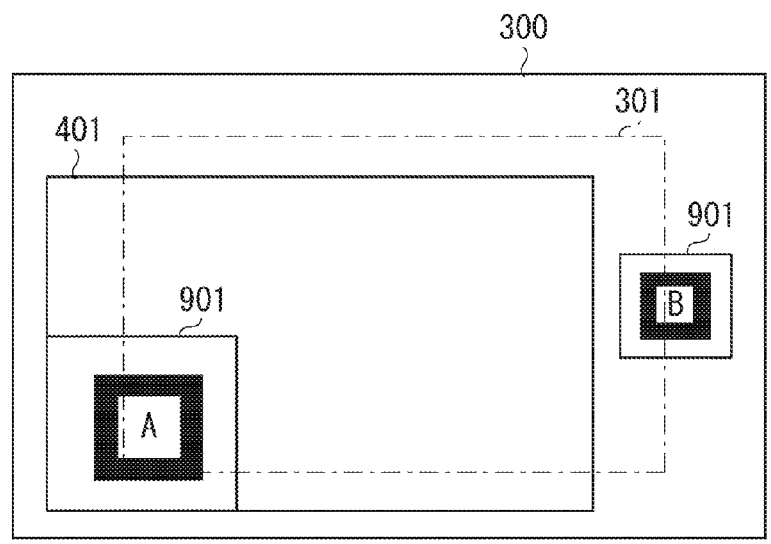
FIGS. 11A, 11B, and 11C are conceptual diagrams each illustrating an example of extending an area of an image for feature detection toward the center.
Figure 11B:
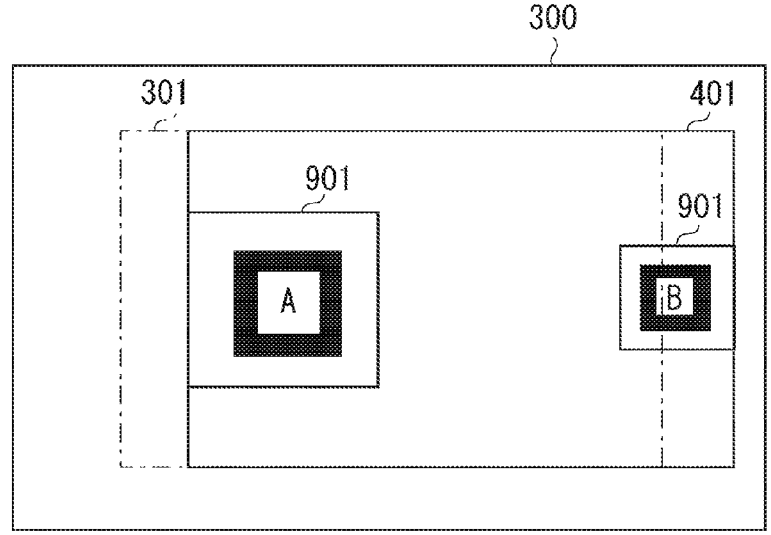
Figure 11C:
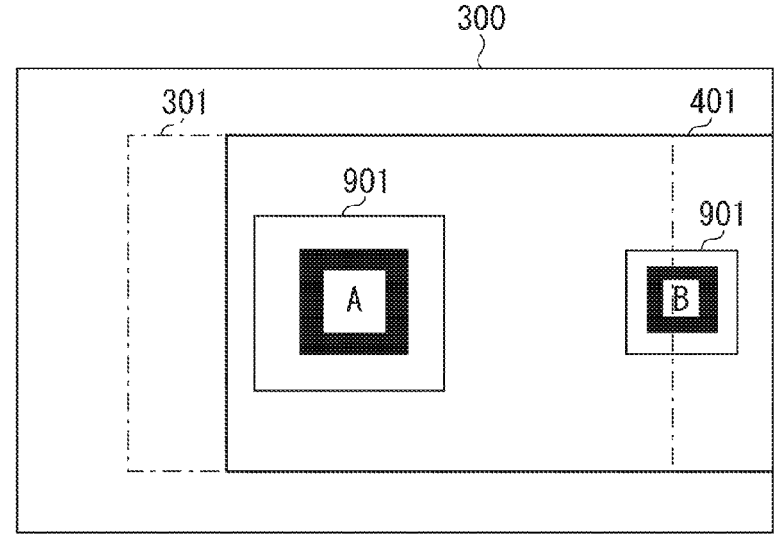

FIGS. 11A, 11B, and 11C are conceptual diagrams illustrating examples of extending an image for feature detection toward the center. In the example illustrated in FIG. 11A, a feature point having the high priority is in a lower left part of the captured image. The image for feature detection is determined to be in an area extending to the upper right from the margin area. In the example illustrated in FIG. 11B, the feature point having the high priority is in a left part of the captured image. The image for feature detection is determined to be in an area extending to the right from the margin area. In the example illustrated in FIG. 11C, the image for feature detection is determined to be in an area extending to the right from the margin area as with the example illustrated in FIG. 11B. The area, however, is determined not to be extended beyond the captured image. In such a manner, the image for feature detection is clipped by extending the area diagonally with respect to the center of the captured image, whereby a plurality of distant feature points can be used. The use of a plurality of distant feature points improves the measurement accuracy of position and orientation, which is useful to the MR system.

According to the foregoing method, the clipping position determination unit 514 clips an area extending toward the center from the feature point having the highest priority. In another method, an image for feature detection may be clipped so that feature points can be used as many as possible. Such a method will be described below.

Figure 12A:
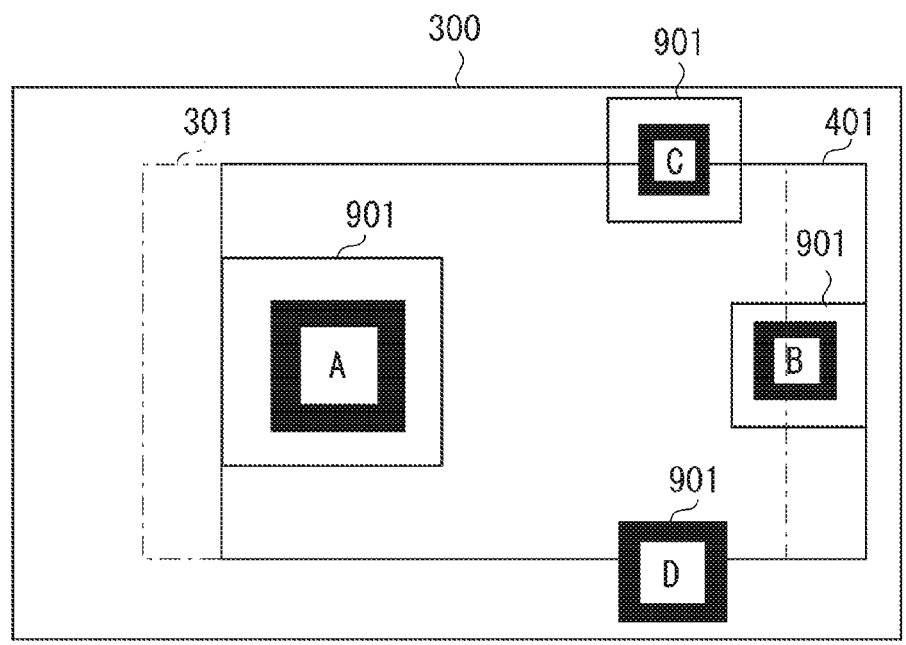
FIGS. 12A and 12B are diagrams each illustrating an example of clipping an image for feature detection so that a lot of feature points are included.
Figure 12B:
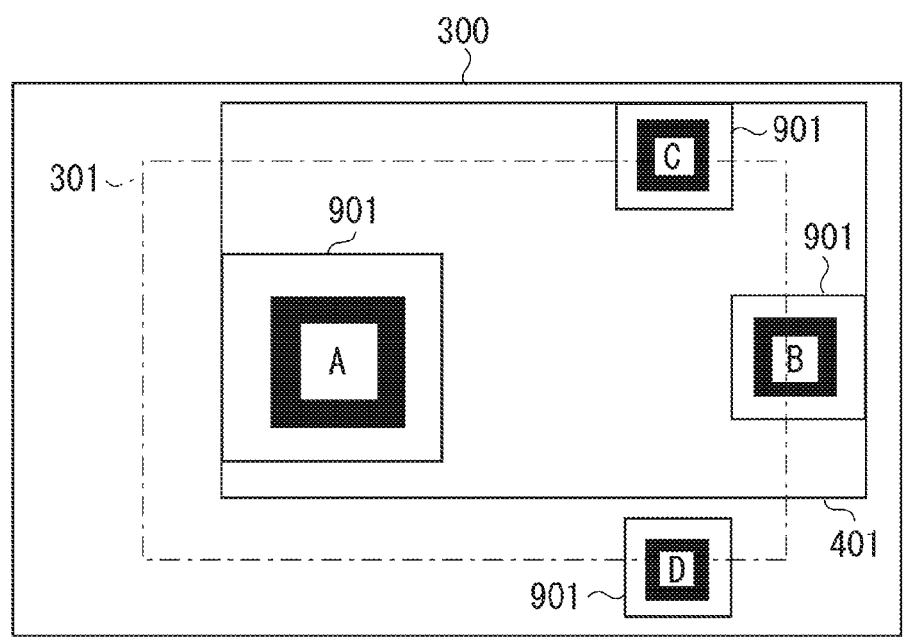

FIG. 12A illustrates an example where the clipping position is determined by the foregoing method. According to the method, the clipping position is determined based only on the feature point having the highest priority. Therefore, feature points C and D are not included in the image for feature detection. In the example illustrated in FIG. 12B, the image for feature detection is clipped so that the feature point having the highest priority is always included and so that the margin areas of other feature points are also included as many as possible. An example of clipping by such a method will be described with reference to FIG. 13.

FIG. 13 is a table illustrating an example of a list of coordinates of the feature points illustrated in FIG. 12. The clipping position determination unit 514 estimates the margin areas of each feature point included in the captured image, and calculates each of the sizes and priority of the margin areas based on the coordinates with the top left of the captured image as the origin. Coordinates $X_{min}$, $X_{max}$, $Y_{min}$, and $Y_{max}$ indicate minimum and maximum values of the coordinates of each feature point. The size of the area to be clipped (clipping frame) is 500 pixels in the X direction and 300 pixels in the Y direction.

The clipping position determination unit 514 initially checks whether there is a position for the clipping frame in which the feature point A having the priority of 1 is always included and the feature point B having the priority of 2 is also included. In the example illustrated in FIG. 13, the feature point A has a coordinate $X_{min}$ of 100 pixels which is the smallest. The feature point B has a coordinate $X_{max}$ of 590 pixels which is the largest. The clipping frame is 500 pixels. The feature points A and B fall within the frame of the area to be clipped in the X direction, and the frame can be moved by 10 pixels in the X direction. Similarly, the feature point A has a coordinate $Y_{min}$ of 100 pixels which is the smallest. The feature point A has a coordinate $Y_{max}$ of 300 pixels which is the largest. The feature point B has a coordinate $Y_{max}$ of 250 pixels. The clipping frame is 300 pixels. The feature points A and B fall within the frame of the area to be clipped in the Y direction, and the frame can be moved by 100 pixels in the Y direction.

The clipping position determination unit 514 then checks whether the feature point C having the priority of 3 falls within the frame. In the example illustrated in FIG. 13, the coordinate $X_{min}$ of the feature point A, the smallest, is 100 pixels. The coordinate $X_{max}$ of the feature point B, the largest, is 590 pixels. The feature point C has a coordinate $X_{max}$ of 520 pixels. The feature point C, therefore, falls within the frame of the area to be clipped in the X direction. The feature point C has a coordinate $Y_{min}$ of 50 pixels which is the smallest. The coordinate $Y_{max}$ of the feature point A, the largest, is 300 pixels. Since the distance therebetween is smaller than or equal to 250 pixels, the feature points A, B, and C can be clipped by the same frame also in the Y direction.

The clipping position determination unit 514 then checks whether the feature point D having the priority of 4 falls within the frame. In the example illustrated in FIG. 13, the coordinate $X_{min}$ of the feature point A, the smallest, is 100 pixels. The coordinate $X_{max}$ of the feature point B, the largest, is 590 pixels. The feature point D has a coordinate $X_{max}$ of 500 pixels. Since the distance therebetween is smaller than or equal to 500 pixels, the feature points A, B, C, and D fall within the frame of the area to be clipped in the X direction. The coordinate $Y_{min}$ of the feature point C, the smallest, is 50 pixels. The feature point D has a coordinate $Y_{max}$ of 470 pixels which is the largest. The distance therebetween exceeds 300 pixels. The feature point D therefore does not fall within the same clipping frame.

As all the feature points have been checked, the clipping position determination unit 514 clips an image in the area according to the size of the clipping frame, from the coordinate $X_{min}$ of the feature point A and the coordinate $Y_{min}$ of the feature point C (here, 100 and 50). The clipping frame may not necessarily be positioned to the coordinate $X_{min}$ of the feature point A and the coordinate $Y_{min}$ of the feature point C.

An image may be clipped so that the center of the coordinates $X_{min}$ and $X_{max}$ and the coordinates $Y_{min}$ and $Y_{max}$ coincides with the center of the clipping frame. In such a manner described above, the clipping position determination unit 514 determines the clipping position by successively performing processing for the feature points in descending order of the priority. If a feature point having certain priority does not fall within the clipping frame and there still is a feature point or points of lower priority, the clipping position determination unit 514 performs similar processing on such feature points.

In the present exemplary embodiment, higher priority is given to a feature point having a larger size on the captured image. In reality, feature points can be seen at an angle, not from the front. In such a case, the priority may be set by performing angle-based corrections instead of determining priority based only on size. Aside from determining priority based on the sizes of the feature points on the captured image, the high priority may be always given to a specific feature point. The same priority may be given to feature points having a certain size or larger. Even in such cases, the clipping frame can be determined by similar processing.

As described above, according to the present exemplary embodiment, the image processing system estimates and clips out an area needed to detect feature points from the captured image. This enables accurate position and orientation measurement without increasing the system load.

A method for measuring a position and orientation by clipping only vicinities of a plurality of feature points having high priority from a captured image will be described as a second exemplary embodiment. Such a technique can be used to accurately measure a position and orientation while further suppressing a transmission load as compared to the first exemplary embodiment. An example of the internal configuration of the image processing system according to the present exemplary embodiment is similar to that of the first exemplary embodiment. Description thereof is thus omitted. In the present exemplary embodiment, only differences from the first exemplary embodiment will be described.

Figure 14:
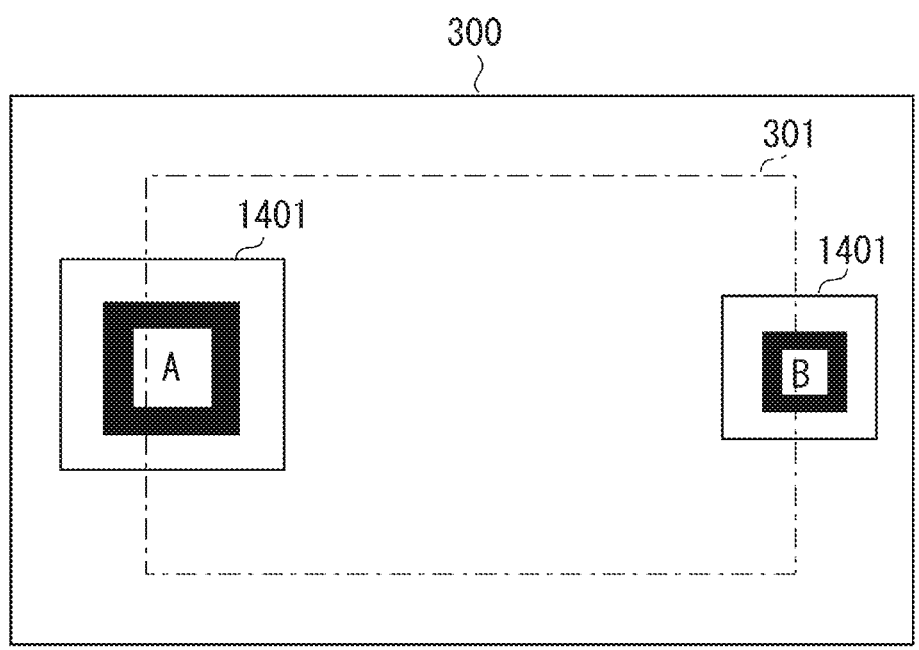
FIG. 14 is a diagram illustrating an example of clipping an image in each margin area as an image for feature detection.

In the first exemplary embodiment, higher priority is given to a feature point having a larger size, and an image for feature detection is clipped so as to include a feature point or points having high priority. In the present exemplary embodiment, a plurality of images for feature detection is clipped so that the amount of data required to detect feature points does not exceed a certain level. As illustrated in FIG. 14, in the present exemplary embodiment, margin areas are calculated in descending order of priority, and the margin area 1401 of each feature point is clipped as an image for feature detection. However, the margin areas of all the feature points are not clipped. Instead, the margin areas are clipped so that the total amount of data of the margin areas is equal to or less than a preset certain data size.

Figure 15:
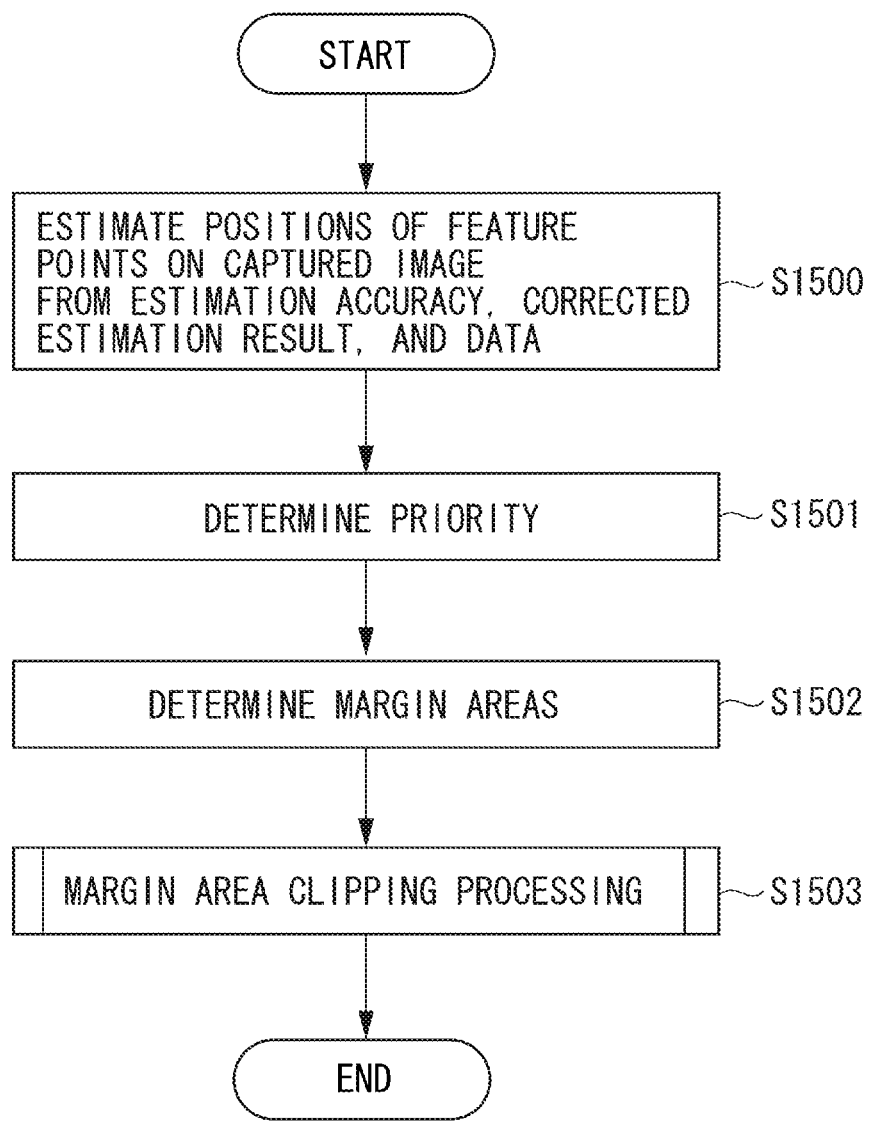
FIG. 15 is a flowchart illustrating an example of a detailed processing procedure of the clipping position determination unit according to a second exemplary embodiment.

FIG. 15 is a flowchart illustrating an example of the detailed processing procedure of the processing by the clipping position determination unit 514 (step S804 illustrated in FIG. 8) according to the present exemplary embodiment.

In step S1500, the clipping position determination unit 514 estimates the positions of feature points on the captured image by a similar method to that of step S1000 illustrated in FIG. 10. In step S1501, the clipping position determination unit 514 determines the priority of a plurality of feature points by a similar method to that of step S1001 illustrated in FIG. 10 or by a method described below. In step S1502, the clipping position determination unit 514 determines margin areas by a similar procedure to that of step S1002 illustrated in FIG. 10.

In step S1503, the clipping position determination unit 514 preferentially clips the margin areas of feature points having high priority.

Figure 16:
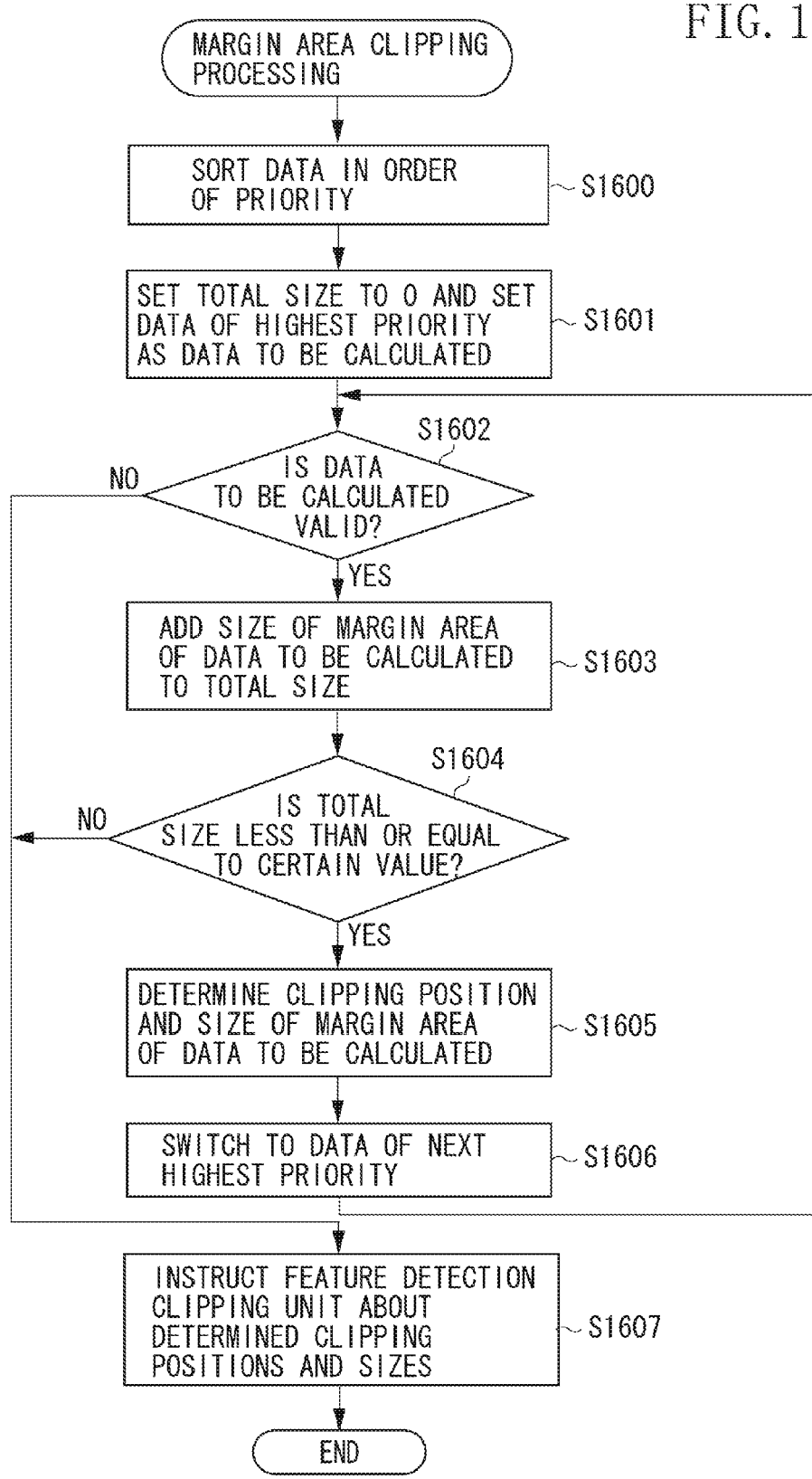
FIG. 16 is a flowchart illustrating an example of a detailed procedure of processing for clipping margin areas.

FIG. 16 is a flowchart illustrating an example of a detailed processing procedure of margin area clipping processing (step S1503 of FIG. 15). FIGS. 17A, 17B, and 17C are tables illustrating an sorting example of feature points based on sizes of margin areas. An example of clipping margin areas will be described below by using the feature points illustrated in FIGS. 17A, 17B, and 17C as an example.

In step S1600, the clipping position determination unit 514 sorts data of the feature points and the sizes of the corresponding margin areas, as illustrated in FIG. 17A in order of priority as illustrated in FIG. 17B. In step S1601, the total size of margin areas is set to 0. Then, the data of the highest priority is set as data to be calculated.

In step S1602, the clipping position determination unit 514 determines whether the set data to be calculated is valid. That the data to be calculated is invalid refers to a situation where all the feature points have been calculated. If the data to be calculated is determined to be valid (YES in step S1602), then in step S1603, the clipping position determination unit 514 adds the size of the margin area of the data to be calculated to the total size of margin areas.

In step S1604, the clipping position determination unit 514 checks whether the added total size of margin areas is less than or equal to a certain value (in the example illustrated in FIGS. 17A, 17B, and 17B, the certain value is 10000). If the total size is determined to be less than or equal to the certain value (YES in step S1604), then in step S1605, the clipping position determination unit 514 determines the clipping position and size of the margin area of the data to be calculated. In step S1606, the clipping position determination unit 514 switches the data to be calculated to data of the next highest priority. The clipping position determination unit 514 returns to step S1602.

If, in step S1602, the data to be calculated is determined to be invalid (NO in step S1602), or if, in step S1604, the total size is determined to be greater than the certain value (NO in step S1604), the processing proceeds to step S1607. In step S1607, the clipping position determination unit 514 instructs the feature detection clipping unit 102 about the clipping positions and sizes determined in step S1605. As illustrated in FIG. 17C, the three feature points of high priority fall within the total size of margin areas of 10000. The clipping position determination unit 514 instructs the feature detection clipping unit 102 about the clipping positions for the margin areas of the three feature points A, C, and B.

Unlike the first exemplary embodiment, according to the second exemplary embodiment, images for feature detection at a plurality of locations are transmitted to the PC 2. A method for transmitting the images for feature detection will be described below.

Figure 18:
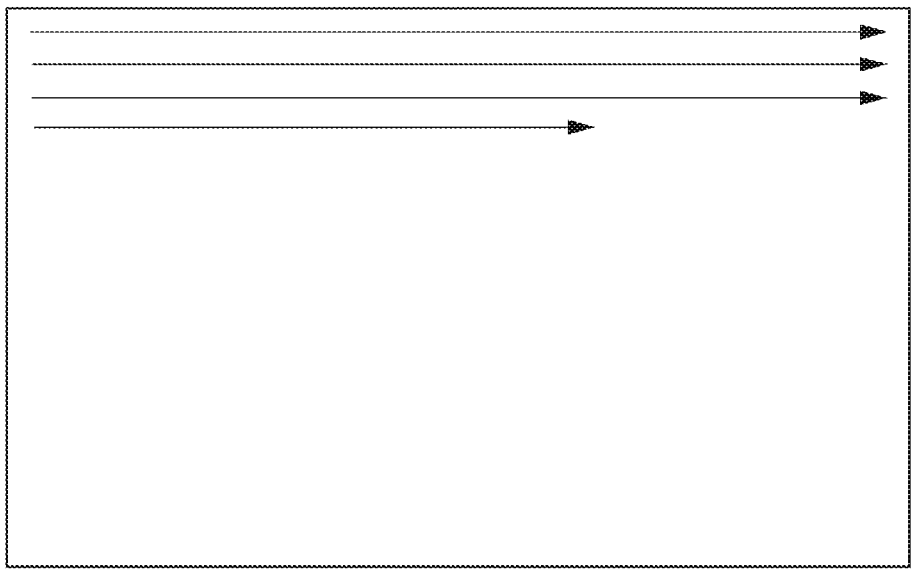
FIG. 18 is a diagram illustrating an input order of pixel data.

For example, as illustrated in FIG. 18, pixel data of a captured image transmitted from the imaging unit 101 is input in order from the top left to the bottom right of the captured image. A method for transmitting data to the PC 2 line by line will be described with reference to FIGS. 19 to 21.

Figure 19:
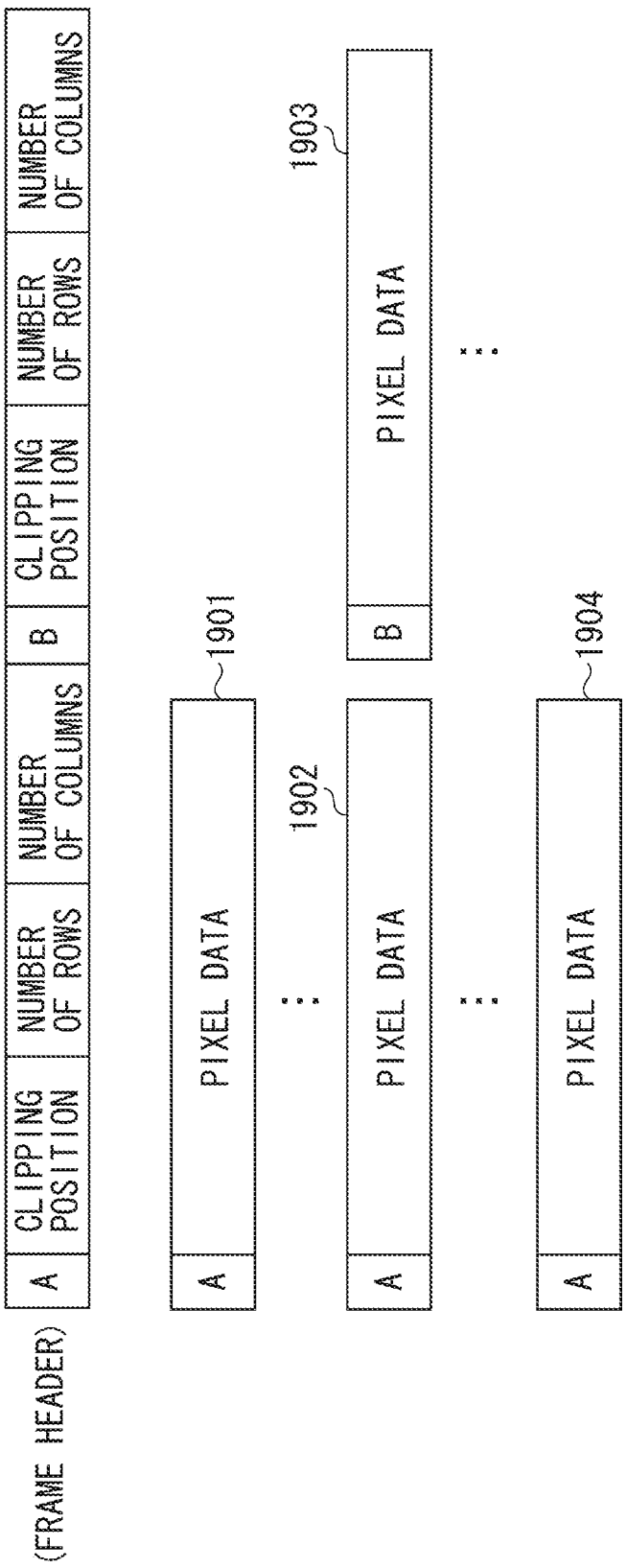
FIG. 19 is a diagram illustrating an example of a structure of data to be transmitted to a personal computer (PC).

FIG. 19 is a diagram illustrating an example of a data structure of images for feature detection to be transmitted to the PC 2. Before transmitting the images for feature detection, the feature detection clipping unit 102 transmits information about the clipping position and size of each clipping area to the PC 2 as a frame header.

Figure 20:
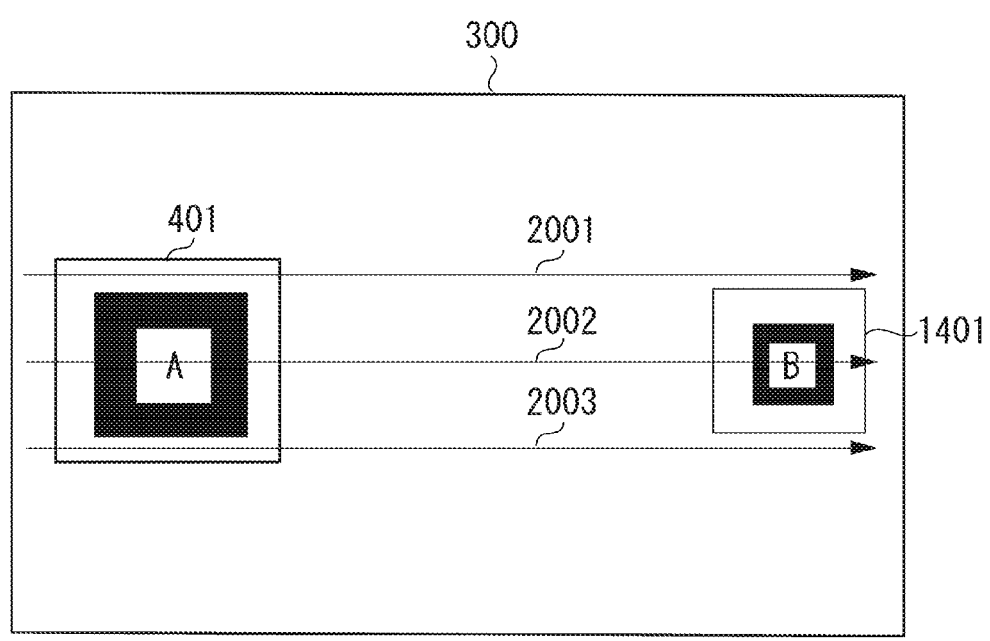
FIG. 20 is a diagram illustrating a procedure for transmitting data to the PC line by line.

If the feature detection clipping unit 102 transmits data of the area of a feature point A on a line 2001 of FIG. 20 to the PC 2, the feature detection clipping unit 102 transmits data 1901 obtained by adding an identifier of the area to the pixel data to the PC 2, as illustrated in FIG. 19. If the feature detection clipping unit 102 transmits data of the areas of the feature points A and B on a line 2002 of FIG. 20 to the PC 2, the feature detection clipping unit 102 transmits data 1902 and 1903 obtained by adding the identifiers of the respective areas to the pixel data to the PC 2, as illustrated in FIG. 19. If the feature detection clipping unit 102 transmits data on the area of the feature point A on a line 2003 of FIG. 20 to the PC 2, the feature detection clipping unit 102 transmits data 1904 obtained by adding the identifier of the area to the pixel data to the PC 2, as illustrated in FIG. 19.

FIGS. 21A, 21B, and 21C are diagrams each illustrating an example of data to be transmitted to the PC 2, sorted in order of transmission. FIG. 21A is a diagram illustrating a pixel data group of the margin area of the feature point A on the line 2001 illustrated in FIG. 20. FIG. 21B is a diagram illustrating pixel data groups of the margin areas of the feature points A and B on the line 2002 illustrated in FIG. 20. FIG. 21C is a diagram illustrating a pixel data group of the margin area of the feature point A on the line 2003 illustrated in FIG. 20. As described above, the feature detection clipping unit 102 initially transmits data of the identifier, the clipping position, the number of rows, and the number of columns of each clipping area to the PC 2 as a frame header. The feature detection clipping unit 102 then transmits the pixel data for each identifier in succession.

Since the position and orientation of the HMD 1 are measured with needed or higher accuracy, the feature detection clipping unit 102 need not transmit all pieces of information about the feature points having a certain size or larger. When transmitting the pixel data to the PC 2, the feature detection clipping unit 102 may thin out the data to be transmitted to the PC 2 every other row and/or every other column so that data for more feature points are transmitted.

Methods for determining priority will be described below. In the first exemplary embodiment, the method for determining priority in order of the size of the feature points on the captured image and the method for always giving high priority to a certain feature point have been described. The former is expected to be used when the accuracy of a close location is important. The latter is expected to be used when the accuracy of a particular location is important. In the second exemplary embodiment, priority may be determined by similar procedures to those of the first exemplary embodiment.

The position and orientation of the HMD 1 in an entire space can be accurately measured more often by using feature points in various positions in the captured image than by using only feature points near a specific area in the captured image. A method for using feature points in various positions in the captured image will be described with reference to FIG. 22, assuming the case of highly accurately measuring the position and orientation of the HMD 1 in an entire space.

Figure 22:
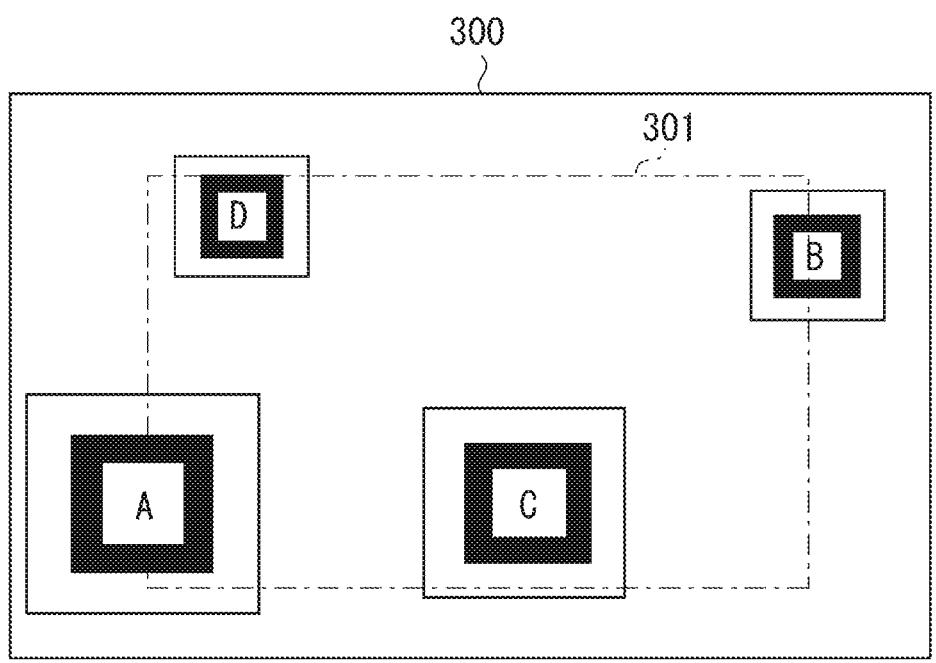
FIG. 22 is a diagram illustrating a procedure for increasing priority of a feature point far from one having the highest priority.

In the example illustrated in FIG. 22, the feature point A is determined as having the highest priority based on the size of the feature points. Then, the feature point B farthest from the feature point A is determined as having the second highest priority. The clipping position determination unit 514 then determines that the feature point D has the third priority and the feature point C has the fourth priority, while controlling the total amount of data of margin areas not to exceed a certain value. In step S1501 of FIG. 15, the clipping position determination unit 514 may determine priority by using such a method. The method for giving high priority to a feature point far from the one having the highest priority may be similarly applied when the HMD 1 obtains a plurality of captured images. In the present exemplary embodiment, such a method may be applied regardless of the resolution and the viewing angle of the captured image and/or the image for combining (image for display).

As described above, according to the second exemplary embodiment, the margin areas of a plurality of prioritized feature points can be clipped as images for feature detection to extract data with a high content of feature points. Therefore, the transmission load can be suppressed to a certain level or lower, and a position and orientation can be highly accurately measured.

According to the foregoing exemplary embodiments, mixed reality space with improved presence can be provided to a user without widening imaging viewing angle or increasing processing load.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-091520 filed Apr. 24, 2013, which is hereby incorporated by reference herein in its entirety.

What is claimed is:

1. An image processing system comprising:
an imaging unit configured to image an outside world to generate a captured image;
a position and orientation estimation unit configured to estimate a position and orientation of the imaging unit;
a feature point estimation unit configured to estimate a position of a feature point in the captured image based on the position and orientation of the imaging unit estimated by the position and orientation estimation unit;
a clipping unit configured to clip an image for combining, and clip an image for feature detection based on the position of the feature point estimated by the feature point estimation unit, the image for combining and the image for feature detection being clipped from the captured image generated by the imaging unit;
a measurement unit configured to detect a feature point from the image for feature detection clipped by the clipping unit, and measure a position and orientation of the imaging unit based on the detected feature point;
a generation unit configured to generate a computer graphics (CG) image based on the position and orientation measured by the measurement unit;
a combining unit configured to combine the image for combining clipped by the clipping unit with the CG image generated by the generation unit; and
a display control unit configured to display the image combined by the combining unit on a display unit.

2. The image processing system according to claim 1, further comprising:
a comparison unit configured to compare the position and orientation measured by the measurement unit with the position and orientation estimated by the position and orientation estimation unit; and
a correction unit configured to correct the position and orientation estimated by the position and orientation estimation unit based on a result of comparison by the comparison unit,
wherein the feature point estimation unit is configured to estimate a feature point in the captured image based on the position and orientation corrected by the correction unit.

3. The image processing system according to claim 1,
wherein the feature point estimation unit is configured to estimate the position of the feature point according to priority in the captured image, and
wherein the clipping unit is configured to clip the image for feature detection to include a feature point according to the priority among feature points whose positions are estimated by the feature point estimation unit.

4. The image processing system according to claim 3, wherein the feature point estimation unit is configured to estimate a size of the feature point and determine the priority based on the size.

5. The image processing system according to claim 3, wherein the feature point estimation unit is configured to determine a specific feature point so as to have the same priority.

6. The image processing system according to claim 3, wherein the feature point estimation unit is configured to determine a feature point farthest from a feature point having the highest priority as the second highest priority.

7. The image processing system according to claim 1, wherein the clipping unit is configured to clip a plurality of images for feature detection so that a total amount of data of the plurality of images for feature detection does not exceed a certain value.

8. An image processing apparatus comprising:
an imaging unit configured to image an outside world to generate a captured image;
a position and orientation estimation unit configured to estimate a position and orientation of the imaging unit;
a feature point estimation unit configured to estimate a position of a feature point in the captured image based on the position and orientation of the imaging unit estimated by the position and orientation estimation unit;
a clipping unit configured to clip an image for combining, and clip an image for feature detection based on the position of the feature point estimated by the feature point estimation unit, the image for combining and the image for feature detection being clipped from the captured image generated by the imaging unit;
a transmission unit configured to transmit the image for feature detection clipped by the clipping unit to an information processing apparatus configured to detect a feature point from the image for feature detection to measure a position and orientation of the imaging unit and generate a computer graphics (CG) image according to the position and orientation;

a reception unit configured to receive the CG image from the information processing apparatus;

a combining unit configured to combine the image for combining clipped by the clipping unit with the CG image received by the reception unit; and a display control unit configured to display the image combined by the combining unit on a display unit.

9. An image processing method comprising:

estimating a position and orientation of an imaging unit configured to image an outside world to generate a captured image;

estimating a position of a feature point in the captured image based on the estimated position and orientation of the imaging unit;

clipping an image for combining, and clipping an image for feature detection based on the estimated position of the feature point, the image for combining and the image for feature detection being clipped from the captured image generated by the imaging unit;

detecting a feature point from the clipped image for feature detection, and measuring a position and orientation of the imaging unit based on the detected feature point;

generating a computer graphics (CG) image based on the measured position and orientation;

combining the clipped image for combining with the CG image generated by the generating; and performing display control for displaying the combined image on a display unit.

10. A non-transitory computer-readable storage medium storing a program for causing a computer to perform an image processing method comprising:

estimating a position and orientation of an imaging unit configured to image an outside world to generate a captured image;

estimating a position of a feature point in the captured image based on the estimated position and orientation of the imaging unit;

clipping an image for combining, and clipping an image for feature detection based on the estimated position of the feature point, the image for combining and the image for feature detection being clipped from the captured image generated by the imaging unit;

detecting a feature point from the clipped image for feature detection, and measuring a position and orientation of the imaging unit based on the detected feature point;

generating a CG image based on the measured position and orientation;

combining the clipped image for combining with the CG image generated by the generating; and performing display control for displaying the combined image on a display unit.

11. An image processing method comprising:

estimating a position and orientation of an imaging unit configured to image an outside world to generate a captured image;

estimating a position of a feature point in the captured image based on the estimated position and orientation of the imaging unit;

clipping an image for combining, and clipping an image for feature detection based on the estimated position of the feature point, the image for combining and the image for feature detection being clipped from the captured image generated by the imaging unit;

transmitting the clipped image for feature detection to an information processing apparatus configured to detect a feature point from the image for feature detection to measure a position and orientation of the imaging unit and generate a computer graphics (CG) image according to the position and orientation;

receiving the CG image from the information processing apparatus;

combining the clipped image for combining with the CG image received by the receiving; and performing displaying control for displaying the combined image on a display unit.

12. A non-transitory computer-readable storage medium storing a program for causing a computer to perform an image processing method comprising:

estimating a position and orientation of an imaging unit configured to image an outside world to generate a captured image;

estimating a position of a feature point in the captured image based on the estimated position and orientation of the imaging unit;

clipping an image for combining, and clipping an image for feature detection based on the estimated position of the feature point, the image for combining and the image for feature detection being clipped from the captured image generated by the imaging unit;

transmitting the clipped image for feature detection to an information processing apparatus configured to detect a feature point from the image for feature detection to measure a position and orientation of the imaging unit and generate a computer graphics (CG) image according to the position and orientation;

receiving the CG image from the information processing apparatus;

combining the clipped image for combining with the CG image received by the receiving; and performing displaying control for displaying the combined image on a display unit.

13. An image processing apparatus comprising:

an imaging unit configured to image a real world to generate a captured image;

a feature point estimation unit configured to estimate a position of a feature point in the captured image;

a clipping unit configured to clip an image for combining, and clip an image for feature detection based on the position of the feature point estimated by the feature point estimation unit, the image for combining and the image for feature detection being clipped from the captured image generated by the imaging unit;

a detection unit configured to detect a feature point from the image for feature detection clipped by the clipping unit;

a position and orientation estimation unit configured to estimate a position and orientation of the imaging unit based on the detected feature point;

a generation unit configured to generate a computer graphics (CG) image based on the position and orientation estimated by the position and orientation estimation unit;

a combining unit configured to combine the image for combining clipped by the clipping unit with the CG image generated by the generation unit; and a display control unit configured to display the image combined by the combining unit on a display unit.

14. An image processing method comprising:

obtaining a captured image from an imaging unit which images a real world to generate the captured image;

estimating a position of a feature point in the captured image;

clipping an image for combining, and clipping an image for feature detection based on the estimated position of the feature point, the image for combining and the image for feature detection being clipped from the captured image;
detecting a feature point from the clipped image for feature detection;
estimating a position and orientation of the imaging unit based on the detected feature point;
generating a computer graphics (CG) image based on the estimated position and orientation of the imaging unit;
combining the clipped image for combining with the generated CG image; and
displaying the combined image on a display unit.

15. A non-transitory computer-readable storage medium storing a program for causing a computer to perform the image processing method comprising:
obtaining a captured image from an imaging unit which images a real world to generate the captured image;
estimating a position of a feature point in the captured image;
clipping an image for combining, and clipping an image for feature detection based on the estimated position of the feature point, the image for combining and the image for feature detection being clipped from the captured image;
detecting a feature point from the clipped image for feature detection;
estimating a position and orientation of the imaging unit based on the detected feature point;
generating a computer graphics (CG) image based on the estimated position and orientation of the imaging unit;
combining the clipped image for combining with the generated CG image; and
displaying the combined image on a display unit.

* * * * *